UNITED STATES PATENT OFFICE.

SYLVESTER LEWIS, OF ROCHESTER, NEW YORK.

IMPROVED MODE OF TREATING OILS AND FATS FOR RENDERING THEM MORE USEFUL FOR BURNING IN LAMPS, LUBRICATING MACHINERY, AND OTHER PURPOSES.

Specification forming part of Letters Patent No. 35,527, dated June 10, 1862.

*To all whom it may concern:*

Be it known that I, SYLVESTER LEWIS, of Rochester, in the county of Monroe and State of New York, have invented a new and useful Improvement in Treating Oils and Fats for Illuminating and Lubricating Purposes; and I do hereby declare that the following is a full and exact description thereof.

The object of my invention is the production of an improved quality of oil for burning in lamps, for lubricating machinery, and other useful purposes, by combining any kind of unctuous oil or fat, whether animal or vegetable, with naphtha or benzole, and with an agent which essentially deodorizes those substances, and by which combination they are rendered less volatile and become non-explosive under ordinary circumstances.

I take any kind of unctuous vegetable or fish oil or animal fat—as lard, tallow—and mix with it about two parts (more or less) of benzole, benzine, or naphtha to one part of the oil or fat, stirring or agitating them in a suitable vessel until the mixture is perfect. A quantity of annotto, previously prepared by dissolving it in a pure benzole or naphtha, is added, and the compound is again shaken or stirred until it is intimately mixed with the oil or fat. The proportion of the annotto is about one-third of an ounce to a gallon of the compound, or sufficient to give a light amber color. Its effect is to clear the mixture of any turbidness it may have, and to deodorize it or neutralize the odor which remains from the benzole. The compound is drawn off into vats, where it should be allowed to remain undisturbed for the space of twenty-four hours, or thereabout. The ingredients should be of a temperature of about 100° Fahrenheit when mixed; but after the mixture has been made it may stand at a lower temperature—say 50° to 70°—while a separation of the solid and liquid portions takes place. At the end of about a day the heavy or solid portions will be found deposited at the bottom of the vats, while the lighter portion remains on the top, and may be drawn off and separated from the other.

The volatile properties of the benzole and naphtha are to a great extent absorbed by the oil or fat in the combination which takes place, so that the liquid which is first drawn off forms a valuable oil for burning in lamps, as it is deprived of its volatile or explosive properties, and burns with a clear dense flame, having a far greater illuminating power than that possessed by petroleum, rock-oil, or its products. It can also be burned in common lamps similar to fluid-lamps, the only difference being that of a larger tube, and no chimney is required.

The denser portions of the fat form an excellent lubricator for machinery. A less quantity of benzole or naphtha in proportion to the oil or fat will have a good effect; but the oil produced is heavy, and its unctuous quality is not sufficiently changed.

The separation of the oleine from the stearine is in a measure effected by a less quantity of the benzole or its equivalent; but the best effect is produced by combining the ingredients in nearly the proportions named.

What I claim as my invention, and desire to secure by Letters Patent, is—

The treatment of vegetable and animal oils and fats by the use of benzole or naphtha and annotto combined, substantially in the manner and for the purposes described.

In witness whereof I have hereunto signed my name in the presence of two subscribing witnesses.

SYLVESTER LEWIS.

Witnesses:
IRA HASKIN,
J. FRASER.